Figure 1:
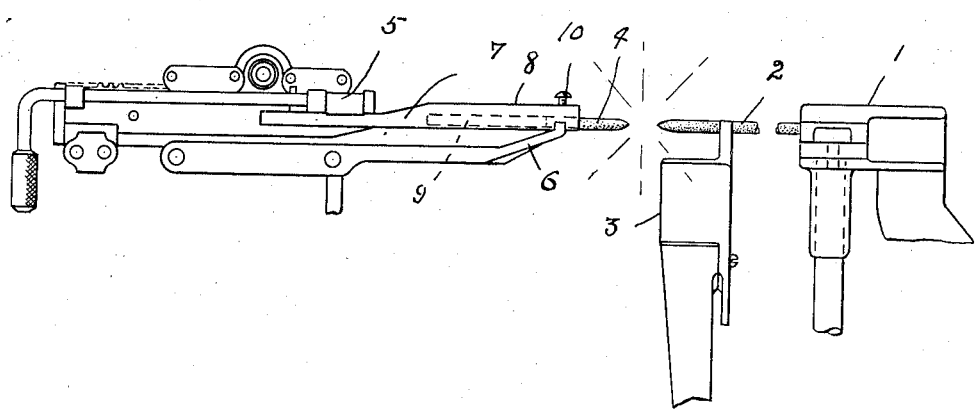

Oct. 18, 1938.                C. B. STONE                2,133,407
                              CARBON HOLDER
                            Filed Jan. 15, 1937

INVENTOR.
Clarence B. Stone.
BY

ATTORNEY.

Patented Oct. 18, 1938

2,133,407

UNITED STATES PATENT OFFICE 2,133,407

CARBON HOLDER

Clarence B. Stone, Saginaw, Minn.

Application January 15, 1937, Serial No. 120,784

3 Claims. (Cl. 176—119)

This invention relates to carbon holders for arc lamps, and has special reference to an adapter, economizer or saver for negative carbon sticks especially adapted for use on a high intensity reflector arc lamp, wherein the carbons are held by carbon clamps with rigid carbon guides near the arcing end of each carbon.

It is well known that in such arc lamps ordinarily considerable waste is experienced due to the fact that so much of the carbon stick at one end is held within the carbon clamp and therefore not usable. It is therefore the principal object of the invention to provide an adapter to hold one end of the carbon, and which adapter is held by the carbon clamp, thus permitting most of the carbon stick to be used and eliminating the waste heretofore experienced.

Another object of the invention is to provide an adapter for carbon sticks which will hold the stick in alignment with the carbon clamp.

Other objects and advantages of the invention will appear in the following description thereof.

Figure 2:
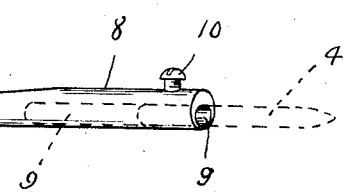

Referring now to the accompanying drawing forming part of this application and wherein like reference characters indicate like parts:

Figure 1 is a fragmental side elevation of the carbon clamps and guides of a high intensity arc lamp showing my improved carbon holder applied thereto, Figure 2 is a perspective view of my improved carbon holder.

In the drawing the numeral 1 represents the positive clamp assembly wherein one end of the positive carbon stick 2 is held, and 3 indicates the upper end of the positive carbon guide and support, which, of course holds the positive carbon in perfect alignment with the negative carbon, indicated at 4.

Ordinarily in such lamps as herein described the non-arcing end of the negative carbon is held in the carbon clamp 5 and the free end of the carbon guide 6 maintains the arcing end of the carbon in alignment with the positive carbon. It will be obvious, of course, that when the negative carbon burns down to a point near the free end of the guide 6, it must be removed and a longer new carbon inserted in its place. To obviate this waste, I provide an adapter, economizer or carbon saver indicated at 7, it being at its smaller end of identical diameter to that of the carbon stick 4, but eccentrically enlarged at the other end as at 8 and having a bore 9 in said enlarged end, and it will be noted that this bore 9 of the enlarged eccentric portion is concentric with the shank portion 7, so that as the carbon is fed over and beyond the forward end of the guide 6 there will be no retarding of the feed, or misalignment of the carbon, by the forward end of the adapter passing over the forward end of the guide, thus permitting of the negative carbon to be almost completely utilized, whereas if such adapter were not provided a materially longer portion of the negative carbon would have to be discarded on account of its having no adapter or holder.

It will also be noted that the additional thickness of material in the eccentrically shaped portion 8 of the adapter is necessary to provide material for the holding set screw 10 in securing the carbon therein.

Also that this eccentric portion and bore 9 is sufficiently long so that should the free end thereof become burned by accidentally not replacing the negative carbon soon enough, it may be cut off and a new hole bored and tapped for the set screw 10, thereby prolonging the life of the adapter.

Having thus described my invention, what I claim and desire to secure by Letters Patent, is:

1. An auxiliary carbon holder for an arc lamp comprising a substantially cylindrical member consisting of a shank portion at one end of the same diameter as a carbon stick to be held by said holder and a materially elongated eccentric enlargement at the opposite end of said member, a bore within said enlargement of the same diameter of said shank portion and the axis of which bore is coincident with the axis of said shank portion, one edge of said bore being in substantially the same plane as one edge of said eccentric enlargement, whereby a carbon stick may be held within said bore with a side portion in substantial alignment with a corresponding side portion of said shank portion.

2. A carbon holder for arc lamps of the character described, comprising a unitary substantially cylindrical member, approximately one half of which is materially larger in diameter than the other half, the larger end having a bore therein parallel therewith and in close proximity to one circumferential face thereof for the reception of a carbon stick, means for holding said stick within said bore, and the smaller end of said holding member being of the diameter of a carbon stick to be held and in substantial axial alignment with said bore in said larger end.

3. A unitary auxiliary carbon holder for an arc lamp having a carbon clamp and V-shaped carbon guide, said auxiliary holder having a shank portion at one end of the same diameter as a carbon stick to be held by said holder, characterized by the opposite end being enlarged eccentrically and elongated materially to provide a suitable cylindrical portion for receiving and holding a carbon stick as nearly as possible concentric with said shank portion, whereby to provide the minimum of disalignment of said stick when the union thereof with said holder is caused to pass over said V-shaped guide.

CLARENCE B. STONE.